United States Patent [19]

Ihara et al.

[11] Patent Number: 5,039,647

[45] Date of Patent: Aug. 13, 1991

[54] CATALYST FOR EXHAUST GAS PURIFICATION AND METHOD FOR PRODUCING THE CATALYST

[75] Inventors: Kazunori Ihara, Iwakuni; Hiroshi Murakami, Hiroshima, both of Japan

[73] Assignee: Mazda Motor Corporation, Hiroshima, Japan

[21] Appl. No.: 319,131

[22] Filed: Mar. 6, 1989

[30] Foreign Application Priority Data

Mar. 14, 1988 [JP] Japan ................................. 63-60961

[51] Int. Cl.$^5$ .................. B01J 21/04; B01J 21/06; B01J 23/10; B01J 23/56
[52] U.S. Cl. ............................ 502/251; 502/303; 502/332; 502/333; 502/334; 423/213.5
[58] Field of Search .............. 502/334, 303, 332, 333, 502/251; 423/213.5

[56] References Cited

U.S. PATENT DOCUMENTS

| | | | |
|---|---|---|---|
| 4,233,189 | 11/1980 | Gandhi et al. | 502/325 |
| 4,367,162 | 1/1983 | Fujitani et al. | 502/304 X |
| 4,587,231 | 5/1986 | Sawamura et al. | 502/304 |

FOREIGN PATENT DOCUMENTS

| | | | |
|---|---|---|---|
| 56-87439 | 7/1981 | Japan . | |
| 59-209646 | 11/1984 | Japan . | |
| 61-197036 | 9/1986 | Japan . | |
| 61-197037 | 9/1986 | Japan . | |
| 63-20036 | 1/1988 | Japan | 502/334 |

*Primary Examiner*—W. J. Shine
*Attorney, Agent, or Firm*—Wenderoth, Lind & Ponack

[57] ABSTRACT

There is provided an improved catalyst for purifying exhaust gases comprising a carrier carrying alumina, zirconium oxide and a noble metal catalyst. The improvement resides in the fact that the carrier carries the alumina as a layer having dispersed therein the zirconium oxide particles, the zirconium oxide particles carrying said noble metal catalyst. The dispersibility of the noble metal catalytic component is thereby improved and the sintering prevention effect on the noble metal catalytic component by the zirconium oxide is effectively exhibited. Thus, the heat-proof property of the catalyst is improved and the cooperation between the noble metal catalytic component and alumina is effectively enhanced, improving longevity of the catalyst.

12 Claims, 6 Drawing Sheets

CATALYST FOR EXHAUST GAS PURIFICATION AND METHOD FOR PRODUCING THE CATALYST

BACKGROUND OF THE INVENTION

The present invention generally relates to a catalyst for exhaust gas purification use.

As a catalyst for purifying the exhaust gases of an automobile or the like, there is known an item, wherein alumina powder is blended in aqueous solution including zirconium oxalate, cerium oxalate and noble metal catalytic components, the compound obtained after drying and burning the blended alumina powder is crushed by a ball mill together with water nitrate diluted to produce slurry liquid, whereby a coating layer is formed on honeycomb carrier, as disclosed in Japanese Laid-open Patent Publication (unexamined) Tokkaisho No. 59-209646.

In the catalyst, zirconium oxide, cerium oxide and noble metal catalytic component are contained in alumina coated layer of the honeycomb carrier surface. In this case, the zirconium oxide is a thermally stable component to prevent the noble metal catalytic component from being sintered (i.e., aggregation coarseness), with the cerium oxide assuming a function as oxygen storing component in such a manner that oxygen in the exhaust gas with oxygen concentration being high is absorbed, and, when the oxygen concentration becomes lower, the oxygen is released to stabilize the catalytic reaction.

As the other catalyst, an alumina coated layer is formed on the honeycomb carrier, which is dipped in a solution containing zirconium oxalate, cerium oxalate, noble metal catalytic component, and so on, and then is picked up, dried, and baked, as disclosed in Japanese Laid-open Patent Publication (unexamined) Tokkaisho No. 56-87430. The coating layer of a mixture between alumina and zirconium oxide is formed on a catalyst carrier, which is dipped in a solution containing cerium nitrate or lanthanum nitrate and noble metal catalytic component, and, then is pulled up, dried and baked, as disclosed in Japanese Patent Publications (unexamined) Tokkaisho Nos. 61-197036 and 61-197037.

In each of the above-described conventional procedures, zirconium oxide and noble metal catalytic component are contained in the alumina coat layer, with each of them being independently dispersed, and not in positively close positional relation. Thus, the zirconium oxide cannot contribute sufficiently towards the sintering prevention of the noble metal catalytic component considering the amount thereof. Also the cerium oxide is aggregated at high temperatures, and is likely to be made coarse so as to lower the oxygen storing effect.

Also, the alumina of the alumina coating layer is in $\gamma$—alumina condition of high activity at the beginning, and becomes finally stable $\alpha$—alumina, with crystal phase transition being caused with the heat, so that the surface area is also reduced to lower the catalytic activity.

SUMMARY OF THE INVENTION

Accordingly, an objective of a first embodiment is to provide a catalyst for exhaust gas purification use, which is capable of improving the dispersibility of the noble metal catalytic component, and of having the zirconium oxide exhibit its sintering prevention effect of the noble metal catalytic component fully, with the heat-proof property being improved.

An objective of a second embodiment is to provide a catalyst for exhaust gas purification use, which is the same as the objective of the first embodiment, and which catalyst is further improved in the thermal stability of cerium oxide and the thermal stability of alumina of the alumina coating layer.

An objective of a third embodiment is to provide a catalyst for exhaust gas purification use, which is the same objective of the first embodiment, and which catalyst is further improved in; as the dispersibility of noble metal catalytic component in the alumina coating layer.

An objective of a fourth embodiment is to provide a catalyst for exhaust gas purification use, which is the same objective of the first embodiment, and which catalyst is also improved in; the thermal stability of cerium oxide and alumina, with cerium oxide being adapted to exhibit its oxygen storing effect sufficiently.

For the solution of the conventional problems, the catalyst for exhaust gas purification used in accordance with the first embodiment has the noble metal catalytic component dispersed in the alumina coating layer, in the form wherein said noble metal catalytic component is carried in the zirconium oxide powder which, in turn, is dispersed in said alumina coating layer, thus providing the alumina coating layer carrying the noble metal catalytic component in the catalytic carrier.

The catalyst for exhaust gas purification use in accordance with the second embodiment has, in the catalyst providing with the alumina coat layer carrying the noble metal catalytic component in the catalytic carrier, the noble catalytic component dispersed in the alumina coating layer, in the form where the noble metal catalytic component is carried in the zirconium oxide powder, and also, lanthanum oxide is dispersed in the alumina coating layer in the form where the lanthanum oxide is carried in the cerium oxide powder which is also dispersed in the alumina coating layer;.

The catalyst for exhaust gas purification use, in accordance with the third embodiment has, in the catalyst provided with the alumina coating layer carrying the noble metal catalytic component in the catalytic carrier, rhodium as the noble metal catalytic component dispersed in the alumina coating layer in the form where the rhodium is carried in the zirconium oxide powder, and also platinum as the noble metal catalytic component is dispersed in the alumina coating layer in the form where the platinum is carried in the alumina powder.

The catalyst for exhaust gas purification use in accordance with the fourth embodiment has, in the catalyst provided with the alumina coating layer carrying the noble metal catalytic component in the catalytic carrier, the alumina coating layer is composed of a base coating layer formed on the catalytic carrier and an overcoat layer formed on the base coating layer, the noble metal catalytic component is dispersed in the base coat layer in the form whereby the noble metal catalytic component is carried in the zirconium oxide powder, and lanthanum oxide is dispersed in the over overcoat layer in the form whereby the lanthanum oxide is carried in the cerium oxide powder dispersed in said overcoat layer.

In the first embodiment, the noble metal catalytic component is dispersed on the zirconium oxide powder said zirconium oxide being is dispersed within the alumina coating layer, and the noble metal catalytic component and the zirconium oxide powder are independent with respect to each other so as not to be maldistributed. As the noble metal catalytic component and the zirconium oxide powder are in mutual contact with each other, the sintering prevention effect of the noble metal catalytic component through the zirconium oxide is sufficiently exhibited, and furthermore the mutual function, especially, reaction at high temperatures between the noble metal catalyst component and the alumina of the alumina coating layer is effectively restrained.

In the second embodiment, the same function as that of the first embodiment is assumed, and also the cerium oxide powder, which is an oxygen storing component, is prevented from being enlarged in crystal growth by the lanthanum oxide in contact therewith, and simultaneously the alumina is, also, prevented from crystal phase transition by the lanthanum oxide.

In the third embodiment, the same function as that of the first embodiment is obtained in the use of rhodium as the noble metal catalytic component, with platinum as the noble metal catalytic component being dispersed on alumina powder which in turn is dispersed within the alumina coating layer;. In this case, as the alumina powder is large in the surface area, the dispersibility of the platinum becomes higher.

In the fourth embodiment, the same function as that of the first embodiment is obtained in the base coat layer, and also, the crystal of the cerium oxide powder for exhibiting the oxygen storing effect in the overcoat layer are effectively prevented from being enlarged in crystal size by the lanthanum oxide in contact therewith, with the crystal enlargement of the alumina of the overcoat layer being prevented by the lanthanum oxide.

According to the first embodiment, as the noble metal catalytic component in the alumina coating layer is dispersed, with the noble metal catalytic component being carried in the zirconium oxide powder, the dispersibility of the noble metal catalytic component is improved and the sintering preventing effect of the noble metal catalytic component by the zirconium oxide is effectively exhibited. Accordingly the heat proof property of the catalyst is improved and the mutual function between the noble metal catalytic component and the alumina is also effectively controlled, with advantages in terms of the activity reduction prevention of the catalyst.

According to the second embodiment, the same effect as that of the first embodiment is obtained and also, lanthanum oxide in the alumina coat layer is dispersed, with the lanthanum oxide being carried in the cerium oxide powder, so that the crystal growth of cerium oxide powder and the crystal phase transition of the alumina, i.e., thermal deterioration is prevented so as to maintain the activity of the noble metal catalyst component for a long time period by the use of the oxygen storing effect of the cerium oxide.

According to the third embodiment, the same effect as that of the first embodiment is obtained with rhodium as the noble metal catalytic component, and also, platinum as the noble metal catalytic component in the alumina coat layer is dispersed with the platinum being carried in the alumina powder, so that the dispersibility of the platinum becomes higher to improve the catalytic activity. According to the third embodiment, the activity in the low temperature region of the catalyst may be improved by the combination between the platinum and the alumina powder through the improvements in thermal-proof property of the catalyst by the combination between the rhodium and the zirconium oxide powder.

According to the fourth embodiment, the same effect as that of the first embodiment is provided in the base coat layer, and also, lanthanum oxide in the overcoat layer is dispersed with the lanthanum oxide being carried in the cerium oxide powder, so that the crystal enlargement of the cerium oxide powder and the alumina, i.e., the thermal deterioration is prevented, and the activity of the noble metal catalytic component may be retained for a long time period by the use of the oxygen storing effect of the cerium oxide. In the fourth embodiment, as the cerium oxide powder is provided in the overcoat layer, the oxygen storing effect is likely to be exhibited, so that the thermal deterioration may be prevented through sufficient exhibition of the oxygen storing effect.

BRIEF DESCRIPTION OF THE DRAWINGS

These and other objects and features of the present invention will become clear from the following description taken in conjunction with the preferred embodiments thereof with reference to the accompanying drawings, in which:

FIG. 1 through FIG. 4 relate to the first embodiment of the invention;

FIG. 5 through FIG. 8 relate to the second embodiment of the invention;

DETAILED DESCRIPTION OF THE INVENTION

Before the description of the present invention proceeds, it is to be noted that like parts are designated by like reference numerals throughout the accompanying drawings.

Embodiment of A first Invention

Figure 1:
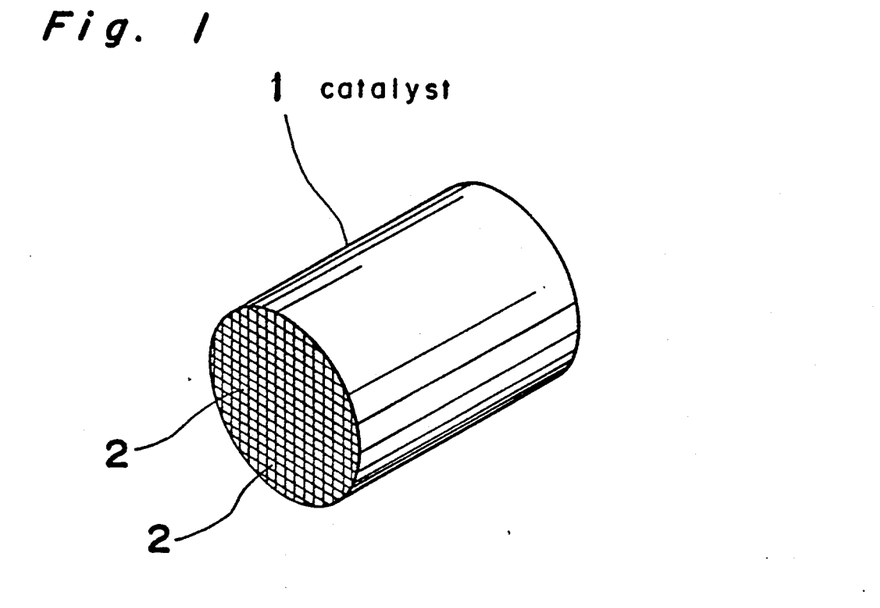
FIG. 1 is a perspective view of a catalyst of the embodiment.

Referring now to the drawings, there is shown in FIG. 1 through FIG. 4, one embodiment of a first invention, wherein a catalyst 1 for purifying the exhaust gas of an automobile is of an honeycomb structural body having many cells 2 therein as shown in FIG. 1.

Figure 2:
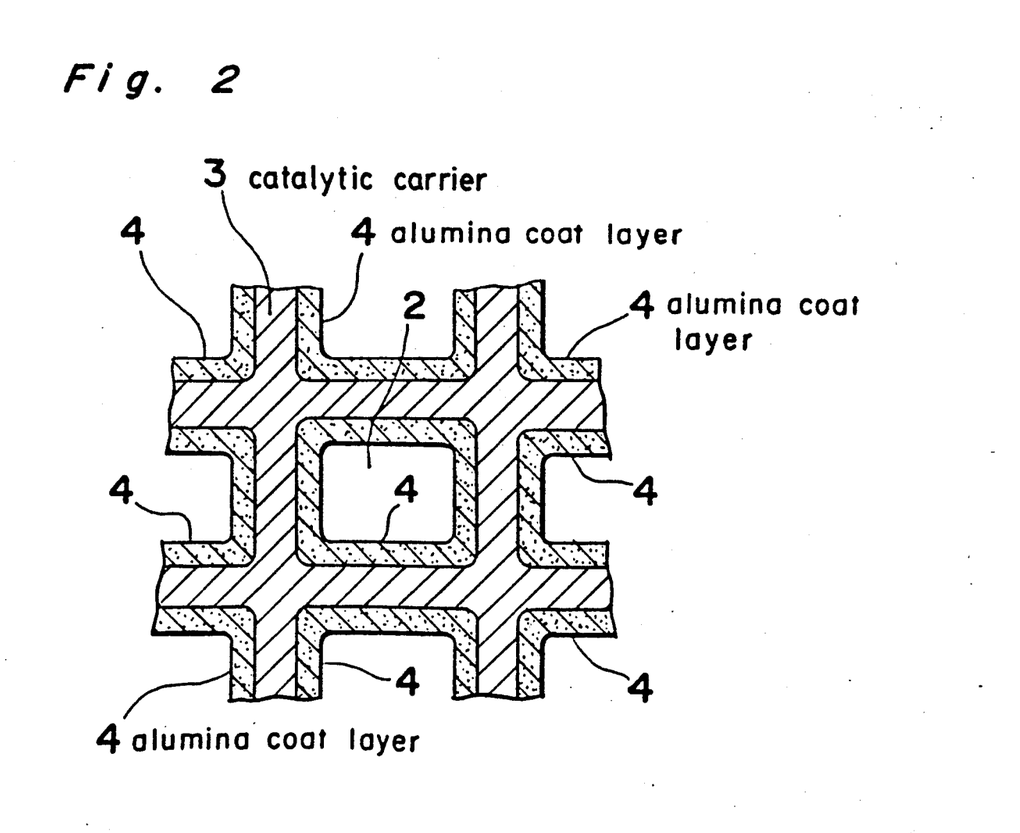
FIG. 2 is a sectional view showing one enlarged portion of the catalyst.

Each of the cells 2 is constructed with an alumina coating layer 4 being provided on the surface of the catalytic carrier 3 as one portion of the catalyst 1 is shown enlarged in FIG. 2.

Figure 3:
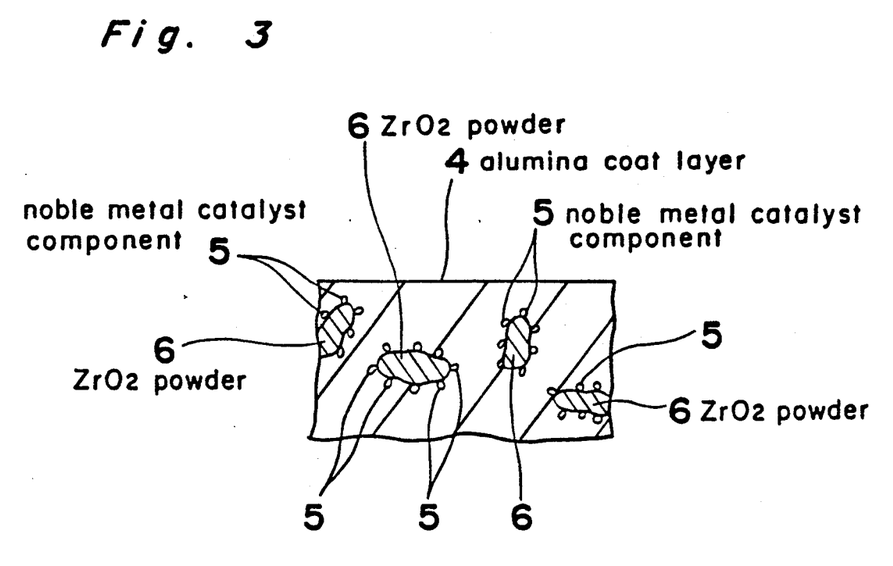
FIG. 3 is a schematic sectional view, on an enlarged scale, showing one portion of an alumina coat layer.

The catalyst carrier 3 is formed of cordierite (ceramics). The noble metal catalytic components 5 are dispersingly contained in the alumina coat layer 4, with the noble metal catalytic components being carried in $ZrO_2$ (zirconium oxide) powder 6 as shown in FIG. 3. The noble metal catalytic component 5 is composed of Pt (platinum) and Rh (rhodium). The average particle diameter of Pt and Rh is approximately 10 Å, with the range of 10 through 50 Å being desirable. The $ZrO_2$ powder 6 is 4 $\mu$ or less in average particle diameter. Also, the amount of the alumina coating layer 4 in the catalyst 1 is 94.5 g per catalyst of one liter (l), the average particle diameter of $Al_2O_3$ is approximately 100 Å, with the range of 50 through 100 Å being desirable, with Pt being 1.4 g/l with respect to catalytic carrier 3 of 1.0 cordierite, Rh being 0.6 g/l, and $ZrO_2$ powder is contained 10% by weight in the alumina coat layer 4. Namely, it is 9.5 g per catalyst of one liter (l). When $CeO_2$ (cerium oxide) is contained in the alumina coating layer 4, the quantity in the alumina coating layer is, for example, approximately 6% by weight, i.e., 7.5 g per catalyst of one liter (l). The average particle diameter of $Ce_2O_3$ is approximately 30 Å, with the range of 30 through 100 Å being desirable. The range of each component is desired to be 89.5 through 99.5 g per carrier of one liter (l) in alumina coat layer, 4.8 through 14.3 g in $ZrO_2$ powder, 3.8 through 12.5 g in $CeO_2$.

The above-described respective numeral values may be property changed if necessary.

In order to produce the catalyst 1, first, the given solution of platinum chloride and rhodium chloride is added into $ZrO_2$ powder 20 g for mixing, impregnating. It is turned into a slurry state and thereafter is dried. Solid thus obtained is crushed by a ball mill. Therefore, the noble metal catalytic component (Pt, Rh) 5 carried in the $ZrO_2$ powder 6 are produced. Then $H_2O$ of 260 cc, nitric acid of 1.6 cc are added into $\gamma-Al_2O_3$ (activity alumina) of 100 g, boehmite of 100 g. $ZrO_2$ powders 6 carrying the noble metal catalytic component 5 are added and $CeO_2$ are added when necessary. Five hours' stirring, mixing is effected by a homomixer so as to obtain alumina slurry solution. Then, the catalytic carrier 3 (1.0 l cordierite) is dipped in the alumina slurry solution so as to be picked up. Thereafter, excessive slurry solution is removed by an air blow of high pressure, and is dried for one hour at 130° C. so as to be baked for one hour and a half at 550° C., thus resulting in the catalyst 1.

In the catalyst 1, the noble metal catalytic component 5 is dispersed on the $ZrO_2$ powder 6, and also is dispersed in the alumina coat layer 3, with the noble metal catalytic component 5 being carried in the $ZrO_2$ powder 6, thus resulting in higher dispersibility. As the noble metal catalytic component 5 and the $ZrO_2$ powder 6 are in mutual contact against each other, the sintering prevention effect of the noble metal catalytic component by the $ZrO_2$ is sufficiently exhibited, and furthermore the mutual operation between the noble metal catalytic component 5 and the alumina of the alumina coat layer 3 is effectively controlled. The dispersibility of the noble metal catalytic component 5 is improved to promote the catalytic activity, so that the function of the $ZrO_2$ is sufficiently exhibited to improve the heat proof property of the catalyst 1.

The heat proof property of the catalyst 1 in the above described embodiment will be described hereinafter in the comparison with respect to the catalyst in the conventional embodiment.

Catalyst In The Conventional Example

In order to manufacture the conventional catalyst, $H_2O$ of 240 cc and nitric acid of 1.6 cc are added into $\gamma-Al_2O_3$ of 100 g and boehmite of 100 g. A catalytic carrier, i.e., cordierite of 1.0 liter (l) is dipped in the alumina slurry solution obtained through five hours' stirring, mixing operations by a homomixer, and is picked up. Then, the excessive slurry liquid is removed by the air blow of high pressure. It is dried at 130° C. for one hour and baked for one hour and a half so as to form the alumina coat layer. The catalytic carrier with the alumina coat layer being formed thereon is impregnated with the solution of given platinum chloride and rhodium chloride. It is dried at 200° C. for one hour and is baked at 600° C. for two hours. then, the similar impregnation, drying, baking operations are effected with respect to the cerium nitrate solution. Then, the similar impregnating, drying, baking operations are effected with respect to zirconium nitrate solution so as to obtain the catalyst. The noble metal catalytic component amount, $ZrO_2$ amount, $CeO_2$ amount in the conventional catalyst are the same in the embodiment of the present invention.

Heating Process

The heating process is applied at 900° C. for fifty hours in air on each of the catalysts in the present embodiment and the conventional embodiment;

Measurement of HC Purification Ratio After Heating Process

Synthetic gas ($C_3H_6$) is heated in an electric furnace, the catalyst is placed with in air to fuel ratio A/F = 14.5, space speed (i.e., gas amount/catalystic volume per hour) of 60000 $H^{-1}$ so as to measure the purification ratio of the $C_3H_6$ at the inlet temperature of each catalyst.

Measurement Results

Figure 4:
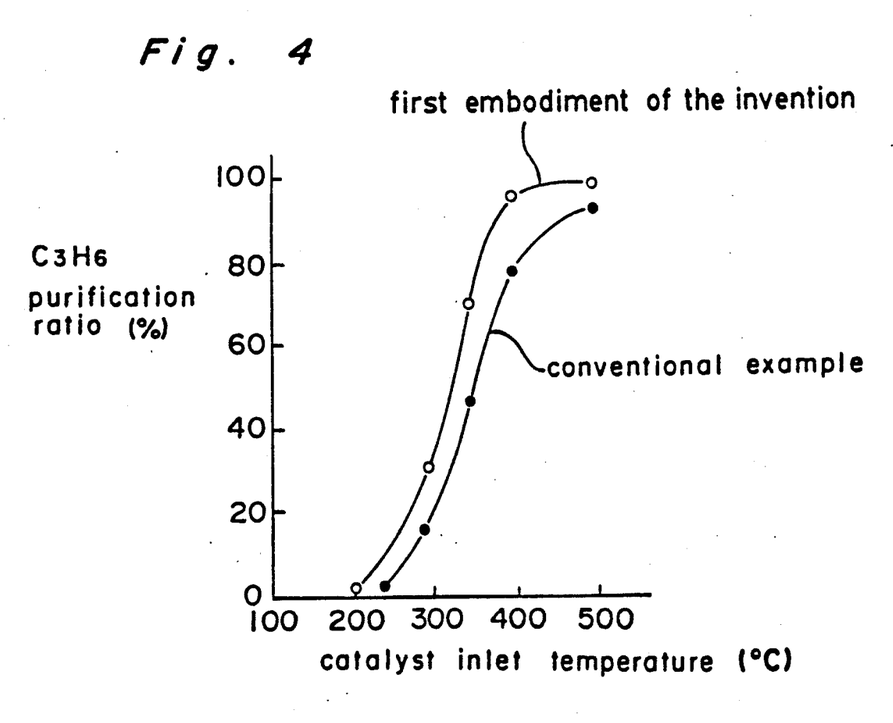
FIG. 4 is a comparison graph of HC purification ratio.

The measurement results are shown in FIG. 4. In the case of the catalyst of the embodiment of the present invention, the purification of the $C_3H_6$ starts at a temperature lower than that in the conventional example. In the inlet temperature of each catalyst, the purification ratio in the embodiment of the present invention is higher than that in the conventional example. It is found out that the carrying of the noble metal catalytic component 5 by the $ZrO_2$ powder 6 contributes towards improvement in the activity and heat-proof property of the catalyst.

Embodiment of A Second Invention

Figure 5:
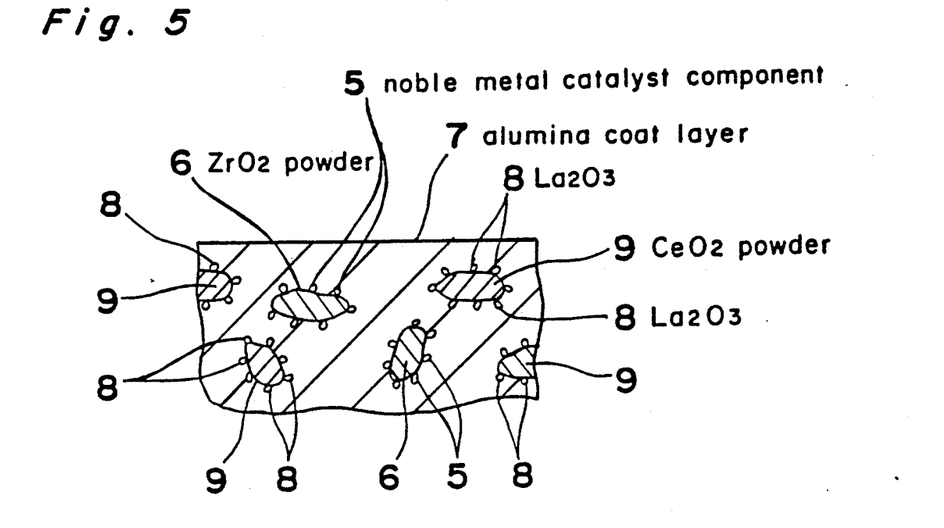
FIG. 5 is a schematic sectional view showing one portion of an alumina coat layer of the embodiment.

With the embodiment of the second invention, one portion of the alumina coat layer of the catalyst is shown in FIG. 5. The catalytic carrier is the same as that of the first invention In the alumina coat layer 7, the noble metal catalytic component (Pt, Rh) 5 is dispersed with the noble metal catalytic component being carried in the $ZrO_2$ powder 6, and also, $La_2O_3$ (lanthanum oxide) 8 is dispersed with the $La_2O_3$ being carried in $CeO_2$ powder 9. Each proportion of the alumina coat layer 7, Pt, Rh, $ZrO_2$ powder 6 and $CeO_2$ powder 9 in the catalyst is the same as that in the embodiment of the first invention. The $La_2O_3$ is approximately 1.4 g for carrier per one (l), with the range of 0.5 through 1.9 g being desirable.

In order to manufacture the catalyst, first, the given solution of platinum chloride and rhodium chloride is added into 20 g of $ZrO_2$ powder for mixing, impregnating. Then, it is turned into a slurry state and thereafter is dried. Solid thus obtained is crushed by a ball mill. Therefore, the noble metal catalytic components (Pt, Rh) 5 carried in the $ZrO_2$ powder 6 are produced. Similarly, $CeO_2$ powder of 12 g is impregnated with given lanthanum nitrate. After the drying operation, it is crushed. The substance with lanthanum oxide carried in the $CeO_2$ powder 9 is produced. Then, $H_2O$ of 280 cc, nitric acid of 1.6 cc are added into the $\gamma$—$Al_2O_3$ of 100 g the boehmite of 100 g, and also, $ZrO_2$ powder 6 carrying the noble metal catalytic component 5 and $CeO_2$ powder 9 carrying lanthanum are added thereto. After five hours' stirring, mixing operations by a homomixer, alumina slurry liquid is produced. The catalytic carrier (1.0 l cordierite) is dipped in the alumina slurry liquid and is picked up. Thereafter, the excessive slurry liquid is removed through the air blowing under high pressure. The remainder is dried at 130° C. for one hour and is baked at 550° C. for one hour and a half, thus producing the catalyst.

In the catalyst in the present embodiment, the relationship between the noble metal catalytic component 5 and the $ZrO_2$ powder 6 is the same as that in the embodiment of the first invention. Though the $CeO_2$ powder 9 has an oxygen storing effect, the crystallizing growth is prevented by the $La_2O_3$ 8 in contact with the $CeO_2$ powder 9, and simultaneously the $La_2O_3$ 8 prevents the $\gamma$—alumina crystal phase transition of the alumina coat layer 7.

In the description of the oxygen storing effect, the $CeO_2$ releases the oxygen when the oxygen concentration of the exhaust gas is lower (on the rich side instead of theoretical air to fuel ratio) so as to maintain the oxidation reaction of CO and HC by the reaction of the following equation, and sucks the oxygen when the oxygen concentration is higher (on the lean side) so as to maintain reducing reaction of the NOx.

$$CeO_2 \rightleftarrows Ce + O_2$$

According to the catalyst of the present embodiment, the crystallizing growth of the $CeO_2$ powder 9 is prevented, so that the oxygen storing effect is maintained for a long period of time. Also, the crystallizing phase transition of the $\gamma$—alumina is prevented, so that the activity of the catalyst is maintained, thus resulting in improved heat-proof property of the catalyst.

Then, the heat-proof property of the catalyst in the present embodiment will be described hereinafter in the comparison between the conventional examples 1 and 2.

Catalyst in the Conventional Example 1

The catalyst in the conventional example 1 is the same as that of the conventional example described in the paragraph of the first embodiment of the invention.

Catalyst in the Conventional Example 2

The catalyst of the conventional example 2 is produced in the following manner. $H_2O$ of 240 cc, nitric acid of 1.6 cc, and given amount of $ZrO_2$ are added into $\gamma$—$Al_2O_3$ of 100 g and boehmite of 100 g. A catalytic carrier (1.0 l cordierite) is dipped in the alumina slurry liquid obtained through five hours' stirring, mixing operations by a homomixer, and is picked up. The excessive slurry liquid is removed through the air blow of high pressure. The remainder is dried at 130° C. for one hour and is baked at 550° C. for one hour and a half so as to form the alumina coat layer. The catalytic carrier with the alumina coat layer being formed thereon is impregnated with the solution of the given platinum chloride, rhodium chloride, and is dried at 200° C. for one hour and is baked at 600° C. for two hours. Then, similar impregnating, drying, baking operations are effected with respect to cerium nitrate solution so as to produce the catalyst. The noble metal catalytic component amount, $ZrO_2$ amount, $CeO_2$ amount in the catalyst are the same as those in the embodiment of the present invention.

Heating Process

The heating process at 900° C. for fifty hours in the air is applied upon the respective catalysts in the present embodiment and the conventional example.

Measurement of HC Purification Ratio After Heating Process

Synthetic gas ($C_3H_6$) is heated at an electric furnace, the catalyst of 24 ml in catalytic amount is placed in air to fuel ratio $A/F = 14.5$, space speed $60000^{-1}$ (gas flow amount 24 l per minute) so as to measure the purification ratio of the $C_3H_6$ at the inlet temperature of each catalyst.

Measurement Results

Figure 6:
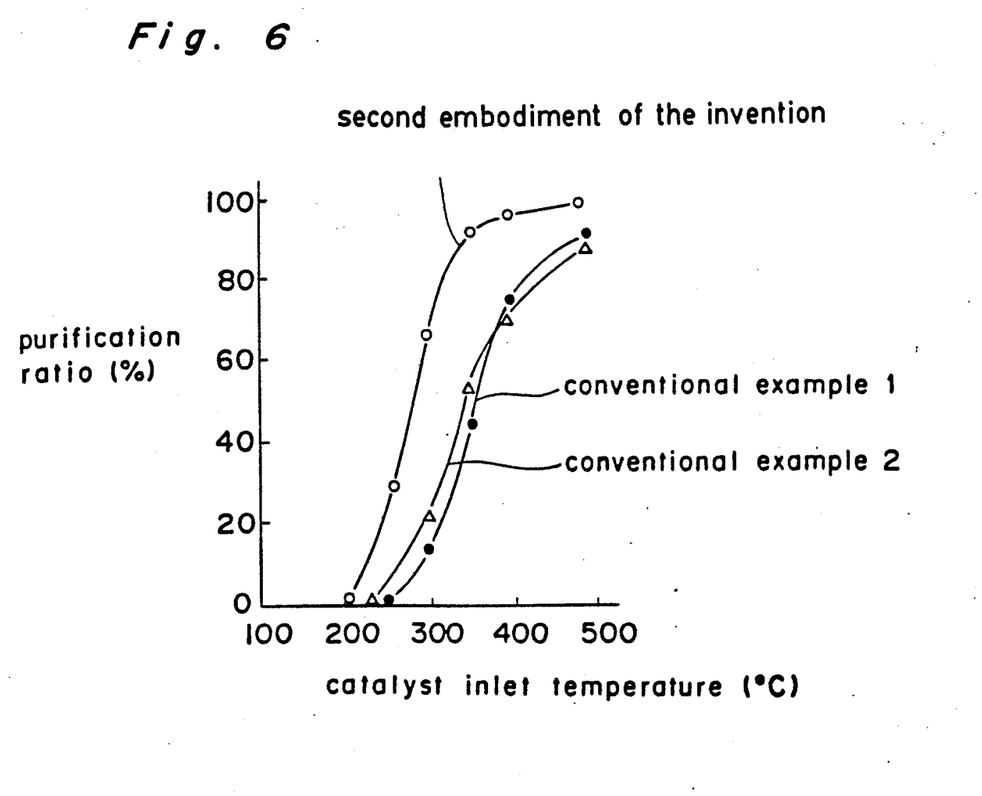
FIG. 6 is a comparison graph of the HC purification ratio.

The measurement results are shown in FIG. 6. The catalyst in the conventional example 2 is somewhat higher at purification ratio in the low temperature region than in the conventional example 1, and is somewhat lower in the high temperature region, although the difference between them is not big. On the other hand, the catalyst in the present embodiment is higher in the purification ratio even in both the low temperature region and the high temperature region than either of the conventional examples 1, 2, and furthermore, the improvements in the purification ratio are recognized as compared with the first embodiment of the first invention. According to the second embodiment of the second invention, it is found out that the $La_2O_3$ 8 is carried in the $CeO_2$ powder 9 and is dispersed so as to improve the heat-proof property of the catalyst.

The influence that the particle diameter of the $ZrO_2$ powder 6 has upon the purification ratio of the HC will be described in accordance with tests 1,2.

Test 1

The HC purification ratio after the heating process is measured about each catalyst among an embodiment 1, wherein the particle diameter of the $ZrO_2$ powder 6 is 3 through 5 $\mu$ (average particle diameter is approximately 4 $\mu$), an embodiment 2, wherein the particle diameter is 7 through 9 $\mu$ (average particle diameter is approximately 8 $\mu$), and a comparison example.

Each catalyst of embodiments 1, 2 is produced by a manufacturing method (a method of using slurry liquid, wherein $ZrO_2$ powder carrying the noble metal catalystic component, $CeO_2$ powder carrying $La_2O_3$, and alumina are mixed) of the previously explained embodiment of the present invention. The catalyst in the comparison example is manufactured by the use of slurry liquid, wherein alumina is added into $ZrO_2$ powder, $CeO_2$ powder, and is uniformly mixed. The particle diameter of the $ZrO_2$ powder in the comparison example is 5 through 10 $\mu$. Each catalyst in the embodiments 1, 2 and the comparison example is 24 ml in catalyst volume, 1.4 g/l in Pt, and 0.6 g/l in Rh.

The respective conditions of the heating process and the purification test are the same as those provided when the data of FIG. 6 has been obtained.

Figure 7:
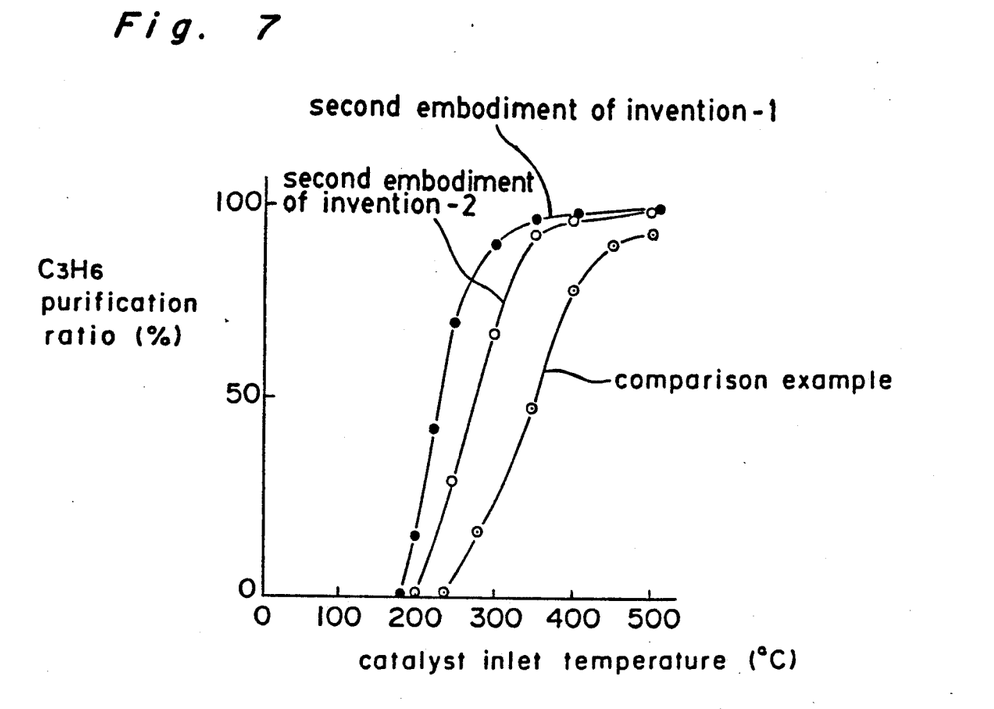
FIG. 7 is also, a similar graph to FIG. 6.

The test results are shown in FIG. 7. According to FIG. 7, the purification ratio in the runs 1, 2 respectively becomes higher than that in the comparison example. The purification ratio becomes higher in the run 1, wherein the average particle diameter of the $ZrO_2$ powder 6 is approximately 4 $\mu$, than in the run 2, wherein the average particle diameter is large.

Test 2

In the test, each catalyst, wherein the average particle diameter of the $ZrO_2$ powder 6 in the embodiment has been varied in the range of approximately 2 through 8 $\mu$, is prepared. The temperature (catalytic inlet temperature), wherein the purification ratio of 50% is obtained after the heat-proof test, is measured on the catalysts. The method of manufacturing the catalyst, the heating process conditions, the purification test conditions, etc. are the same as those of the test 1.

Figure 8:
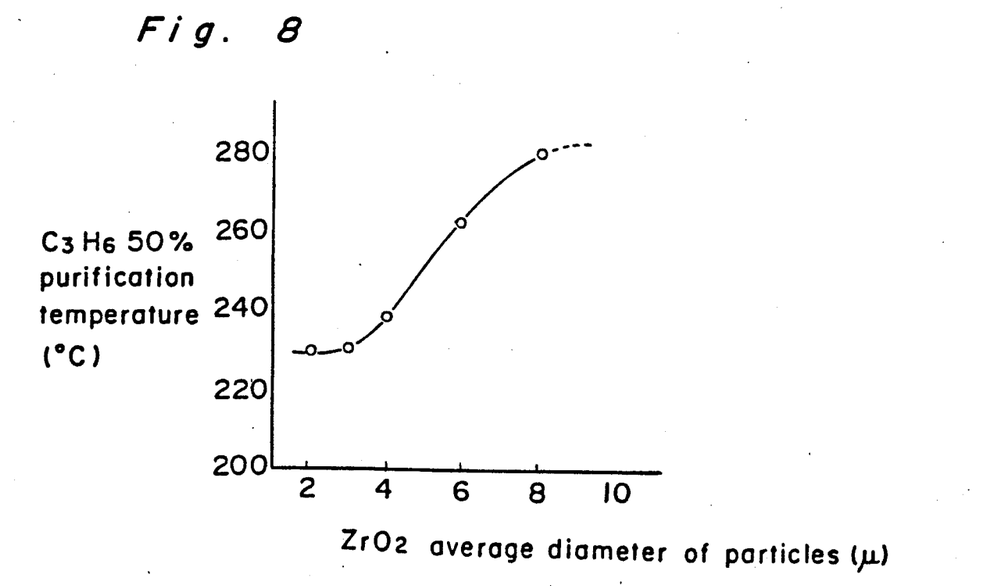
FIG. 8 is a graph showing the relationship between the average particle diameter of $ZrO_2$ powder and the HC purification temperature.

The test results are shown in FIG. 8. According to FIG. 8, it is found out that the purification is advanced even at the comparatively low temperatures if the average particle diameter of the $ZrO_2$ powder 6 is 4 $\mu$ or less. It is found out that specially 3 $\mu$ or lower is desirable.

It is natural that functional effect by the average particle diameter of the above-described $ZrO_2$ powder 6 should be applied as it is in the first embodiment of the invention. The functional effect is applied even in each embodiment of the third and fourth embodiments described hereinafter.

Embodiment of A Third Invention

Figure 9:
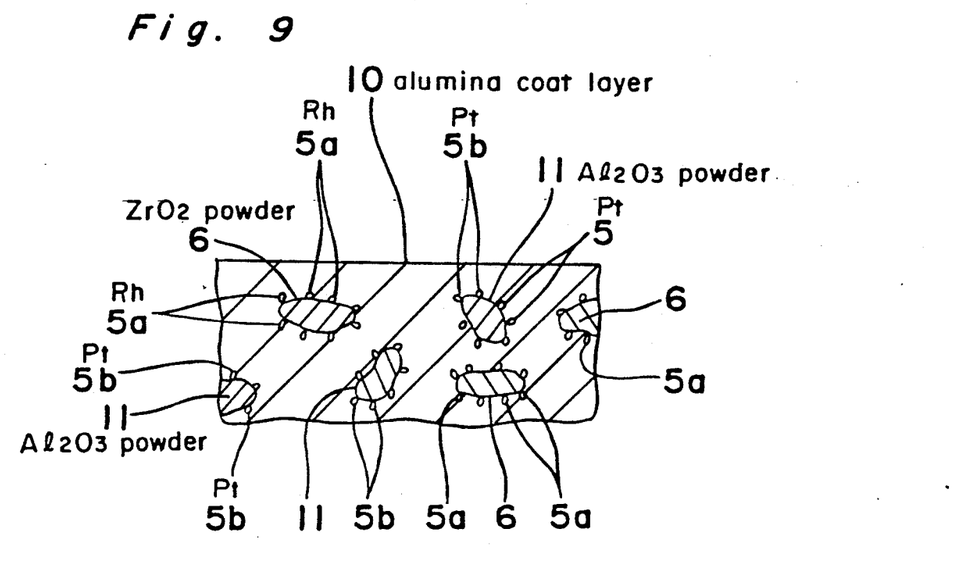
FIG. 9 is a schematic sectional view showing one portion of an alumina layer in the third embodiment of the invention.

In the third embodiment of the invention, one portion of the alumina coat layer 10 of the catalyst is shown in FIG. 9. The catalytic carrier is the same as that in the first embodiment of the invention. In the alumina coat layer 10, Rh5a as the noble metal catalystic component dispersingly contained, with the Rh5a being carried in the $ZrO_2$ powder 6, and also, Pt5b as the noble metal catalystic component is dispersingly contained, with the Pt5b being carried in the $Al_2O_3$ powder 11. Each proportion of the alumina coat layer 10, Pt, Rh, $ZrO_2$ and $CeO_2$ in the catalyst, and the average particle diameter of the $ZrO_2$ powder 6 are the same as those in the first embodiment of the invention.

In order to manufacture the catalyst, first, the given rhodium chloride solution is added to the $ZrO_2$ powder of 10 g is added, mixed, impregnated into slurry state. Thereafter, the solid dried is crushed by a ball mill. Thus, substance carrying Rh5a in the $ZrO_2$ powder 6 is obtained. Similarly the $\gamma$—$Al_2O_3$ of 10 g is impregnated with a platinum chloride solution. After the drying operation, it is crushed so that a substance having Pt5b carried in the $Al_2O_3$ powder 11 is obtained. The $H_2O$ of 260 cc nitric acid of 1.6 cc are added into the $\gamma$—$Al_2O_3$ of 100 g, the boehmite of 100 g, and the $ZrO_2$ powder 6 carrying the Rh5a and the $Al_2O_3$ powder carrying the Pt5b are added thereinto. After five hours' stirring, mixing by a homomixer, alumina slurry liquid is obtained. The catalytic carrier (1.0 l cordierite) is dipped in the alumina slurry liquid and is picked up. Thereafter, the excessive slurry liquid is removed by the air blow of high pressure. The remainder is dried at 130° C. for one hour and is baked at 550° C. for one hour and a half so as to obtain the catalyst.

In the catalyst, the relationship between the Rh5a and the $ZrO_2$ powder 6 is fundamentally the same as that in the embodiment of the first invention. The Pt5b is dispersed on the $Al_2O_3$ powder 11 and also, is dispersed in the alumina coating layer 10, with the Pt5b being carried in the $Al_2O_3$ powder 11. In this case, the $Al_2O_3$ powder 11 is larger in surface area as compared with the $ZrO_2$ powder 6, so that the dispersibility of the Pt5b is higher correspondingly. As the catalyst is not in positive adjacent relation at Pt5b and $ZrO_2$ powder 6, the high sintering prevention effect cannot be effected in the Pt5b, thus resulting at higher catalyst activity in the low temperature through improvements in the dispersibility by the $Al_2O_3$ powder 11.

Then, the catalytic activity and heat proof property of the catalyst in the embodiments will be described in the comparison in the catalyst between the conventional example and the embodiment of the first invention.

Figure 10:
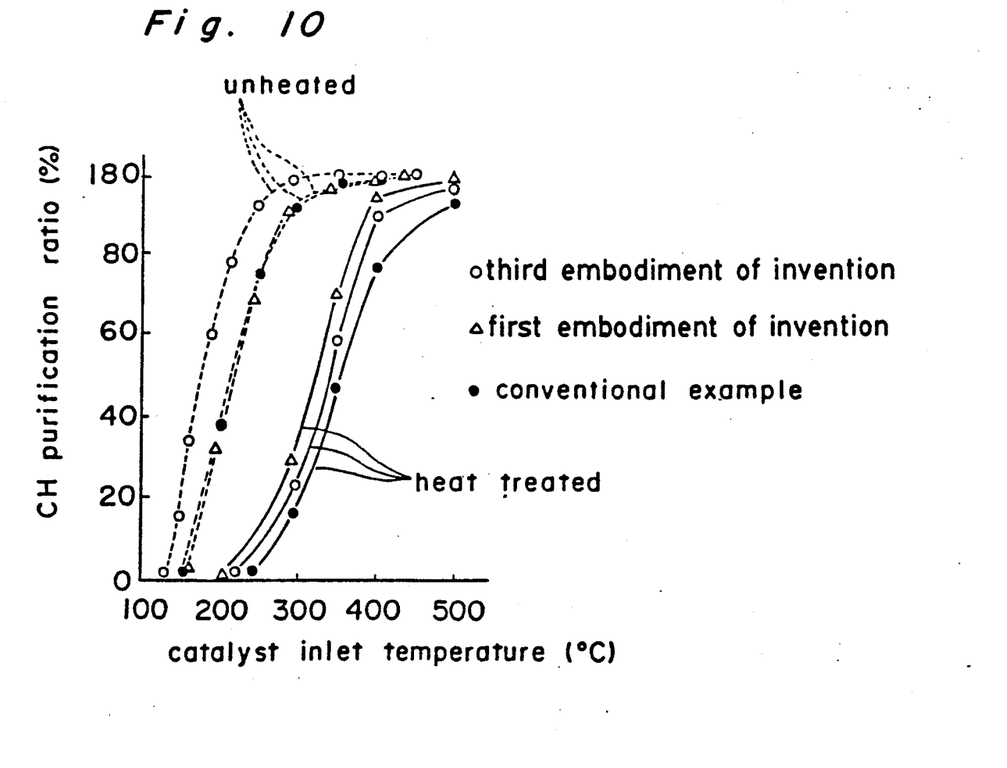
FIG. 10 is a comparison graph of the HC purification ratio in the embodiment of FIG. 9.

The catalyst in the conventional example is the same as that of the conventional example described in the embodiment of the first invention. Also, the above-described three catalyst conditions (noble metal catalytic component, $ZrO_2$ amount, $CeO_2$ amount, etc.) compared with are the same as those of the embodiment of the first invention. In the comparison test, the HC purification ratio is to be measured respectively about one catalyst not subjected to the heating process, and the other catalyst subjected to the heating process. The conditions of the heating process and the measuring conditions of the purification ratio are the same as those of the embodiment of the first invention. The measuring results are shown in FIG. 10.

Referring to each catalyst not heated, there is hardly any difference between the first embodiment of the invention and the conventional example. On the other hand, the catalyst in the third embodiment of the invention shows the high purification from the low temperature as compared with the two former catalysts. It is found out that the carrying of the Pt5b with respect to the $Al_2O_3$ powder 11 contributes greatly towards the improvements in the lower temperature activity of the catalyst.

In each catalyst after the heating operation, the catalyst in the embodiment of the third invention has intermediate purification ratio characteristics between the first embodiment of the invention and the conventional example. In the third embodiment of the invention, it is hard for the sintering prevention effect of the $ZrO_2$ to reach the Pt5b, thus rendering the heat-proof property somewhat lower, because the Rh5a is carried in the $ZrO_2$ powder 6 and the Pt5b is carried in the $Al_2O_3$ powder 11. However, the heat-proof property is also higher than that in the conventional example. In the third embodiment of the invention, both the heat-proof property and the low temperature activity may be achieved at the same time.

Fourth Embodiment

Figure 11:
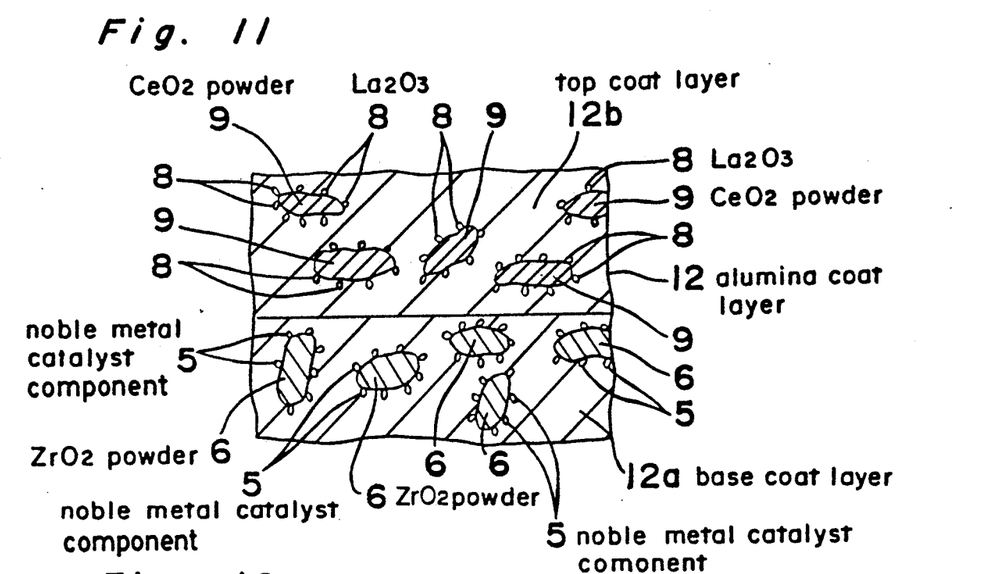
FIG. 11 is a schematic sectional view showing one portion of an alumina coat layer in the fourth embodiment of the invention.

In the fourth embodiment of the invention, one portion of the alumina coat layer 12 of the catalyst is shown in FIG. 11. The catalytic carrier is the same as that of the first embodiment of the invention.

The alumina coat layer 12 is composed of two layers i.e., a base coat layer 12a formed on the catalytic carrier and a base over coat layer 12b formed on the base coat layer 12a. In the base coat layer 12a, the noble metal catalytic component (Pt, Rh) 5 is dispersed, with the noble metal catalytic component being carried in the $ZrO_2$ powder 6 of 4 $\mu$ or lower in average particle diameter. In the overcoat layer 12b, $La_2O_3$ 8 is dispersed, with the $La_2O_3$ 8 being carried in the $CeO_2$ powder 9. The overcoat layer 12b is adjusted to become 21% by weight with respect to the condition of the catalytic carrier and the base coat layer 12a so that the Pt amount in the catalyst may become 1.4 g/l, the Rh amount 0.6 g/l, the base coat layer 12a 14% by weight with respect to the catalytic carrier, i.e., 108.0 g per l in carrier. Also, the $ZrO_2$ powder 6 is adjusted to become 10% by weight with respect to the base coat layer 12a, i.e., 6.3 g per l in carrier, the $CeO_2$ powder 9 to become 50% by weight with respect to the combination of the base coat layer 12a and the overcoat layer 12b, i.e., 85.6 g per l in carrier, the $La_2O_3$ 8 to become 1.5% by weight with respect to the over coat layer 12b, i.e., 1.6 g per l in carrier.

In the range of each component, it is desired that the amount of the base coat layer is 58 g through 68 g per l in carrier, the amount of the $ZrO_2$ powder is 3.2 g through 9.5 g, the amount of the overcoat is 100 g through 115 g, the amount of the $CeO_2$ powder is 81 g through 91 g, the $La_2O_3$ is 0.5 g through 2.1 g.

It is to be noted that the above-described respective numerical values show one example, and may be properly changed when necessary.

In order to manufacture the above-described catalyst, first, the solution of the given platinum chloride and rhodium chloride is added into the $ZrO_2$ powder of 20 g for the mixing, impregnating operations thereof. After the slurry operation, the solid thus obtained through the drying operation is crushed by a ball mill. Thus, a substance carrying the noble metal catalyst component 5 in the $ZrO_2$ powder 6 is obtained. Then, the $H_2O$ of 260 cc, the nitric acid of 1.6 cc are added into the $\gamma-Al_2O_3$ of 100 g, boehmite of 100 g, and also, the $ZrO_2$ powder 6 carrying the metal catalystic component 5 is added thereinto. After five hours' stirring, mixing operations by a homomixer, the alumina slurry liquid is obtained. And the alumina slurry liquid is impregnated with the catalystic carrier (1.0 l cordierite). After it has been picked up, the excessive slurry liquid is removed by blowing of high pressure air. It is dried at 130° C. for one hour, and is baked at 550° C. for one hour and a half so as to form the base coat layer 12a.

Similarly, a given amount of lanthanum nitrate and water are added into the $CeO_2$ powder of 100 g and the mixing, impregnating, drying, crushing operations are effected so as to obtain substance carrying lanthanum oxide La in the $CeO_2$ powder 9. The boehmite is mixed with the respect to it at the rate of 80/20 in weight ratio (20 is boehmite). Water is added thereinto so as to effect stirring, mixing operations for five hours by a homomixer. The former catalytic carrier with a base coat layer 12a formed thereon is dipped into the slurry liquid thus obtained, and is picked up. The excessive slurry liquid is removed by the air blow of high pressure. It is dried at 130° C. for one hour, is baked at 550° C. for one hour and a half so as to form an overcoat layer 12b.

In the catalyst of the present embodiment, the relationship between the base coat layer 12a and the noble metal catalytic component 5 is the same as that in the first embodiment of the invention. In the overcoat layer 12b, the crystal growth of the $CeO_2$ powder 9 is effectively prevented by the $La_2O_3$ 8 in contact with it. The $CeO_2$ powder 9 is provided in the overcoat layer 12b which is likely to exhibit an oxygen storing effect and to be influenced thermally. The crystal growth is prevented by the $La_2O_3$ 8 so that the oxygen storing effect may be exhibited for a long period.

Then, the heat proof property of the catalyst in the above described embodiment will be described in the comparison with that of the catalyst in the comparison example.

Catalyst in the comparison example

In order to manufacture the catalyst, $H_2O$ of 240 cc, nitric acid of 1.6 cc are added into the $\gamma-Al_2O_3$ of 100 g and the boehmite of 100 g. The catalytic carrier (1.0 l cordierite) is dipped in the alumina slurry liquid provided by the five hours, stirring, mixing operations by a homomixer, and is picked up. The excessive slurry liquid is removed by the air blow of high pressure. It is dried at 130° C. for one hour, and is baked at 550° C. for one hour and a half. Furthermore, the impregnating, drying, baking operation of the platinum chloride and rhodium chloride solution are effected, and the impregnating, drying, baking operations of the zirconium nitrate are effected so as to serve as the base coat layer. A given amount of water is added into the $CeO_2$ of 100 g and the boehmite of 20 g so as to produce the slurry liquid. The substance with the base coat layer being formed thereon is dipped. The air blowing, drying, baking operations are effected. The impregnating, drying, baking operations are effected of the lanthanum nitrate so as to manufacture the catalyst with the overcoat layer being formed thereon.

In the comparison test, both the catalysts are heated at 900° C. in air for fifty hours, heating operation so as to thereafter measure the purification ratio of the HC. The measuring conditions A/F = 14.7 ± 0.9, 60000 $H^{-1}$ (gas flow amount 24 l per minute) in space speed, 24 ml in catalytic volume. It is to be noted that the noble metal catalytic component amount and the other quantity conditions of both the catalysts are the same.

Figure 12:
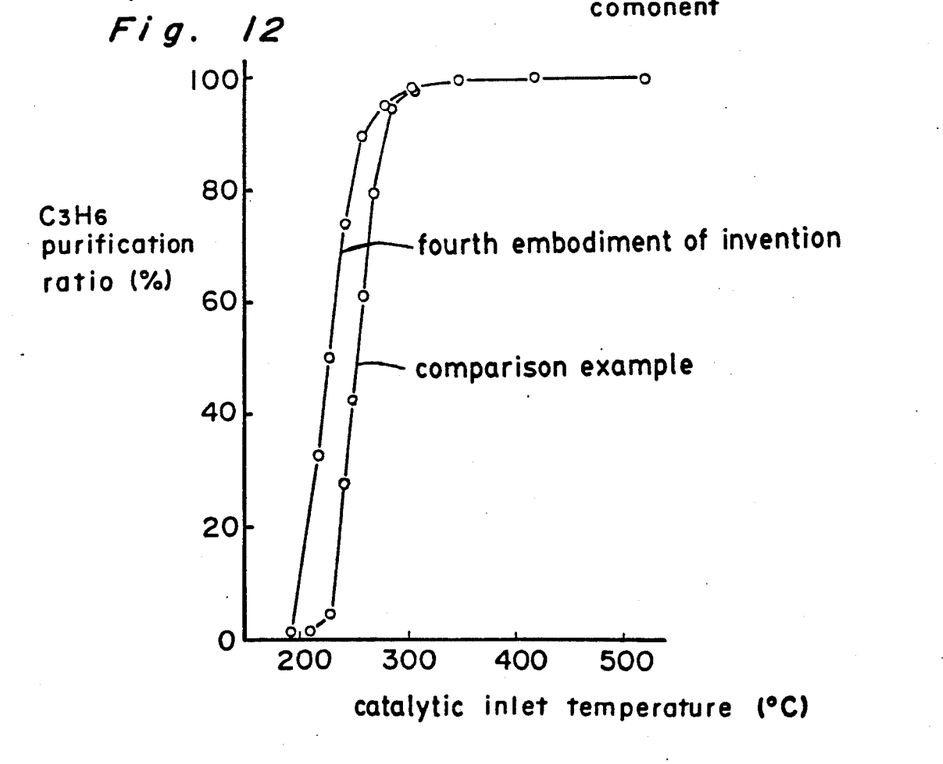
FIG. 12 is a comparison graph of the HC purification ratio in the embodiment of FIG. 11.

The measuring results are shown in FIG. 12. The catalyst in the embodiment is higher purification ratio than that in the comparison example. It is recognized that the noble metal catalytic component 5 is carried in the $ZrO_2$ powder 6 in the base coat layer 12a and the $La_2O_3$ 8 is carried in the $CeO_2$ powder 9 in the overcoat layer 12b so as to contribute towards the improvements in the purification ratio.

In the respective embodiments, a ceramic honeycomb construction member is used as a catalytic carrier, but a monolith of other construction or pellet type may be used. Furthermore, a metallic carrier may be used.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. In a catalyst for purifying exhaust gases comprising a carrier carrying alumina, zirconium oxide and a noble metal catalyst, the improvement wherein:

said carrier carries the alumina as a layer having dispersed therein the zirconium oxide particles, said zirconium oxide particles carrying said noble metal catalyst.

2. The catalyst according to claim 1 wherein said alumina layer additionally contains cerium oxide particles having lanthanum oxide dispersed therein.

3. The catalyst according to claim 1 wherein said zirconium oxide particles contain rhodium as said noble metal catalyst and said alumina layer additionally contains alumina particles dispersed therein, said alumina particles carrying platinum as a further noble metal catalyst.

4. The catalyst according to claim 1 wherein said alumina layer is a base coat and has an overcoat layer thereon, said overcoat layer containing cerium oxide particles dispersed therein, said cerium oxide particles carrying lanthanum oxide.

5. The catalyst as defined in claim 1, 2 or 4 wherein the noble metal catalyst component is platinum.

6. The catalyst as defined in claim 1, 2 or 4 wherein the noble metal catalyst component is rhodium.

7. The catalyst as defined in claim 1, 2, 3 or 4 wherein the average diameter of the zirconium oxide powder is less than 4 μ.

8. The catalyst as defined in claim 1, 2, 3 or 4 wherein the catalyst carrier is formed in a honeycomb construction of cordierite.

9. A method for producing a catalyst for purifying exhaust gases containing an alumina coating layer including a noble metal catalyst component which comprises the steps of:

a. forming a slurry of zirconium oxide particles with a liquid containing a noble metal catalyst component;

b. drying said slurry and crushing the resultant product to form particles of zirconium oxide carrying said noble metal catalyst component;

c. forming a slurry comprising gamma-alumina, boehmite, water, nitric acid and said zirconium oxide particles carrying said noble metal catalyst component;

d. immersing a carrier in said slurry; and e. drying and baking said slurry on said carrier to form an alumina coated carrier.

10. The method according to claim 9 wherein slurry of step c. additionally contains cerium oxide particles carrying lanthanum oxide, said cerium oxide particles being produced by adding cerium oxide powder to a liquid containing lanthanum nitrate, then drying the liquid and crushing the resultant product.

11. The method according to claim 10 wherein the slurry of step c. also contains alumina particles containing platinum, said particles being produced by adding alumina powder to a liquid containing platinum chloride, then drying said liquid and crushing the resultant product.

12. The method according to claim 9 wherein after step e., forming a further slurry containing said cerium oxide particles carrying lanthanum oxide, boehmite and water and then dipping said alumina coated carrier of step e. into said slurry, drying said slurry and baking the resultant product to form an overcoat on said alumina layer, said cerium oxide particles containing lanthanum oxide being produced by adding cerium oxide into a liquid containing lanthanum nitrate, then drying and crushing the resultant product to form cerium oxide particles containing lanthanum oxide.

* * * * *